United States Patent [19]

Sande

[11] Patent Number: 4,735,439

[45] Date of Patent: Apr. 5, 1988

[54] DEVICE FOR COUPLING AND SIMULTANEOUSLY LOCKING OF TWO COMPONENTS BOTH RADIALLY AND AXIALLY

[75] Inventor: Kurt Sande, Fredrikstad, Norway

[73] Assignee: Skarpenord Control Systems a.s., Rjukan, Norway

[21] Appl. No.: 919,213

[22] Filed: Oct. 15, 1986

[30] Foreign Application Priority Data

Nov. 8, 1985 [NO] Norway .................. 854451

[51] Int. Cl.$^4$ .............................................. F16L 35/00
[52] U.S. Cl. ...................................... 285/18; 285/315; 285/920
[58] Field of Search ............... 285/18, 24, 27, 305, 285/308, 314, 315, 334.4, 425, 920; 166/338, 339, 341, 344

[56] References Cited

U.S. PATENT DOCUMENTS

| 847,472 | 3/1907 | Hafer | 285/27 |
|---|---|---|---|
| 1,604,211 | 10/1926 | Williams | 285/27 |
| 2,736,384 | 2/1956 | Potts | 285/18 |
| 2,839,315 | 6/1958 | Arterbury et al. | 285/18 |
| 2,962,096 | 11/1960 | Knox | 285/920 |
| 3,163,222 | 12/1964 | Foster et al. | 285/920 |
| 3,163,223 | 12/1964 | Bauer et al. | 285/18 |
| 4,049,297 | 9/1977 | Reneau | 285/24 |
| 4,372,584 | 2/1983 | Miller | 285/315 |
| 4,591,191 | 5/1986 | Fournié et al. | 285/18 |

FOREIGN PATENT DOCUMENTS

| 2004341 | 3/1979 | United Kingdom | 285/18 |
| 311083 | 8/1971 | U.S.S.R. | 285/18 |

Primary Examiner—Dave W. Arola
Assistant Examiner—Anthony Knight
Attorney, Agent, or Firm—Wenderoth, Lind & Ponack

[57] ABSTRACT

A self-coupling flange for coupling and at the same time both axially and radially locking two components especially is suited for coupling of an actuator to a valve. The flange includes an upper member to be fixed to or incorporated into one component and a lower part member to be fixed to another component. An annular piston having a locking ring is movable into an inner axial opening in the lower member to move the two members from an offset position to an aligned position with respective sloping contact faces in abutment.

9 Claims, 3 Drawing Sheets

DEVICE FOR COUPLING AND SIMULTANEOUSLY LOCKING OF TWO COMPONENTS BOTH RADIALLY AND AXIALLY

BACKGROUND AND SUMMARY OF THE INVENTION

Because of the development of oil and gas fields at even greater depths, there is a need for devices which make possible coupling and uncoupling of components without the use of divers. Such devices must therefore be suitable for installation by remote control and give a good and secure coupling of the components. The need for such a coupling arises, for example, for joining actuators to valves, joining valves to pipes, joining pipes to pipes and also connecting hydraulic/electric circuits. Such a coupling can also be used in other fields where there is a need for a "rapid" joining of components.

The object of the present invention is to provide a coupling which enables a rapid and secure installation and locking of components. Uncoupling should also be easy to carry out.

A further object is to provide a coupling which will function satisfactorily by remote control and thereby be suited for use to connect and disconnect components at great ocean depths where diving operations must be avoided.

Another object of the invention is to provide a coupling ensuring both radial and axial locking of the components.

BRIEF DESCRIPTION OF THE DRAWINGS

The preferable design of the device according to the invention will be described with reference to the accompanying drawings, wherein.

DETAILED DESCRIPTION OF THE INVENTION

Figure 1:
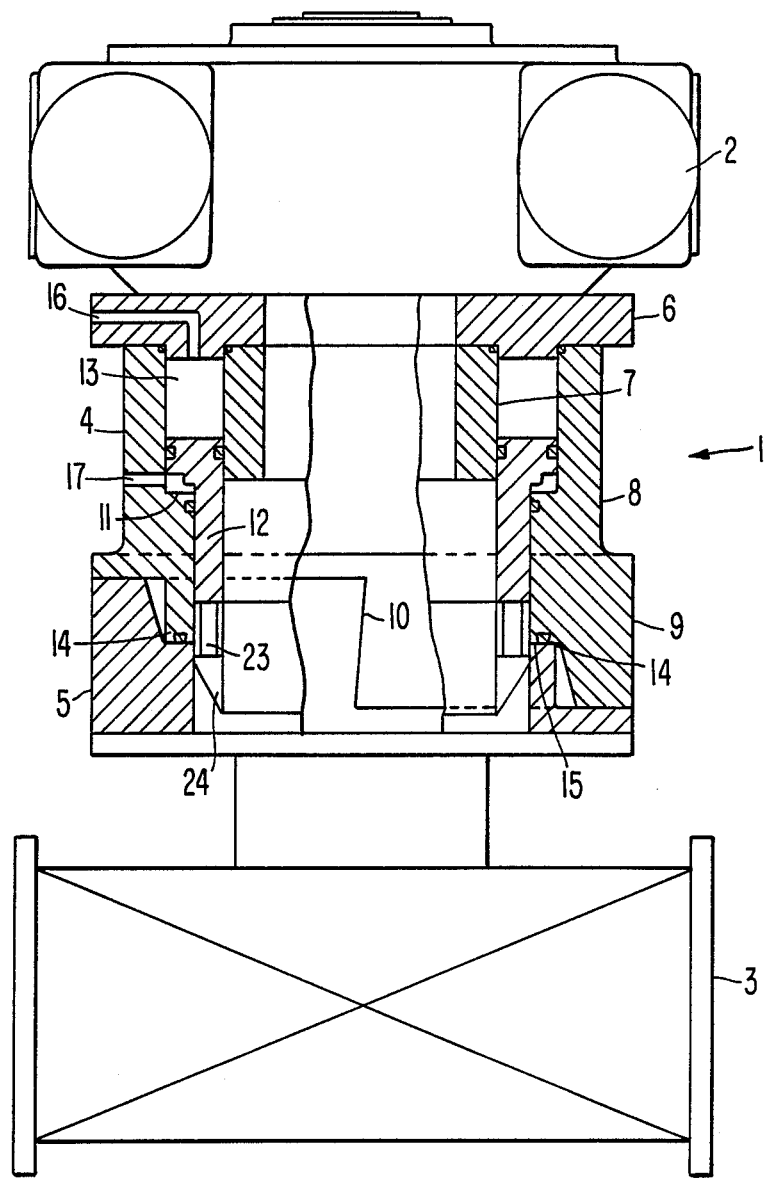
FIG. 1 is an elevational view, partly in section, showing a self-coupling flange with a locking device as a coupling between an actuator and a valve.

In FIG. 1 a self-coupling flange with a locking device 1 is shown activated as a coupling between an actuator 2 and a valve 3. The coupling consists of an upper coupling member 4 arranged to be fixed to one unit and with a lower coupling member 5 arranged to be fixed to another unit. The upper member 4 of the coupling consists of an upper plate 6, an inner cylinder 7 fixed to the plate and a surrounding cylindrical part also fixed to the plate 6. The surrounding cylindrical part includes an upper cylindrical encircling portion 8 passing on to a lower cylindrical encircling portion 9 with greater external diameter. The lowermost part of the encircling portion 9 is formed as a semicylinder with sloping contact faces 10 complementary to faces 22 of an upper portion of the lower coupling member 5, to be described below with reference to FIGS. 2(A)–2(C).

The inner diameter of the upper cylindrical encircling portion 8 is diminished at a point below the inner cylinder 7 in such a way that there is formed a stop shoulder 11 for an annular piston 12. The piston 12 can thereby be moved up and down in an annular space 13 formed between the upper plate 6, the inner cylinder 7 and the upper cylindrical encircling portion 8 of the coupling. In the lower cylindrical portion 9 the inner diameter is increased in such a way that there is formed a radial flat face 14 which functions as a continuous contact face against a corresponding contact face 15 of the lower coupling member (FIG. 2(A)). Both the annular piston 12 and the upper contact face 14 are fitted with O-ring seals to ensure a tight and secure function of each of the parts. The upper half of the coupling is provided with flow passages 16, 17 for hydraulic fluid. A flange is formed due to abutment between faces 14, 15 and between sloping contact faces 10, 22.

Figure 2A:
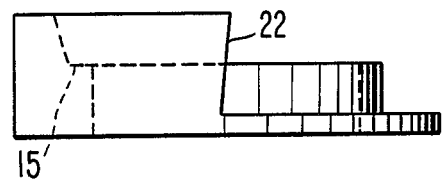
FIGS. 2(A), 2(B) and 2(C) are elevation, plan and perspective views, respectively, of a lower part of the coupling.
Figure 2B:
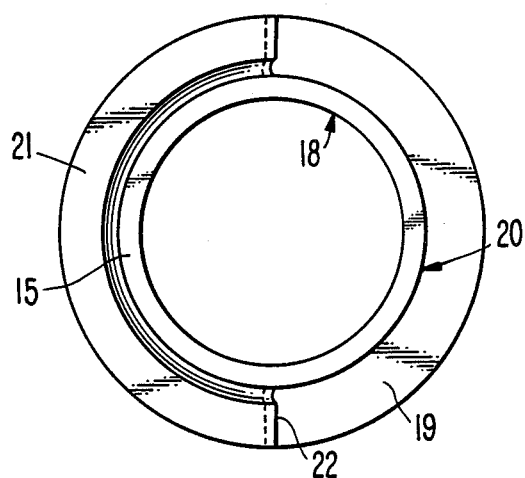
Figure 2C:
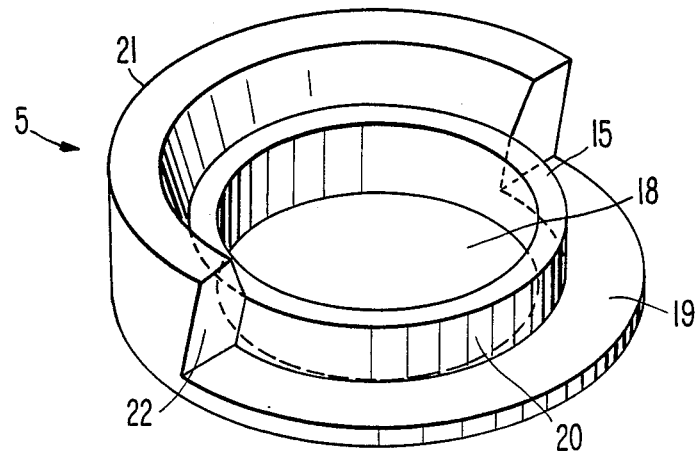

FIGS. 2(A)–2(C) particularly show the lower coupling member 5, but the technical details of the upper and lower members are complementary.

FIG. 2(A) shows the lower member 5 of the coupling in side elevation, 2(B) shows the lower member seen from above, and FIG. 2(C) shows the lower member in perspective. The lower coupling member is cylindrical and has therethrough an axial opening 18. The upper part of the coupling has also an opening with the same diameter. One half of the coupling member 5 is formed as a semicircular disc 19 joined radially with an axially extending semicylindrical part 20 with a smaller outer diameter. The top face of part 20 continues in the other half of the lower member 5 of the coupling. This face 15 will come into contact with the corresponding upper contact face 14 of the upper part of the coupling when the coupling is activated. The other half of the lower member 5 of the coupling is a semicylindrical axially extending collar 21 which is higher than part 20 and which has an inner surface sloping toward the face 15. The collar 21 has sloping contact faces 22 which will come into contact with the corresponding/same sloping contact faces 10 (FIG. 1) of the upper member of the coupling.

Further, the coupling is equipped with a locking ring 23 (FIGS. 1 and 3) which is fixed to the annular piston 12. To couple the two members 4 and 5, members 4 and 5 are arranged in such a way that the plane faces 14 and 15 physically are in contact. Because of the slope of contact faces 10 and 22, the two members 4 and 5 will be in positions slightly (between 8 and 12 mm) offset or eccentric to each other. Locking is achieved by actuating the annular piston 12 to move the locking ring 23 from a starting position in the upper member 4 into the opening 18 in the lower member 5. A lower portion 24 of the locking ring has a conical outer surface 24 that ensures that the two members 4 and 5 of the coupling always will be brought together into axial alignment with a radial movement therebetween. Thus, the smallest diameter of the surface 24 will penetrate within the circumference of the opening 18 in the lower member 5 of the coupling. The surface 24 of the locking ring will tend to entirely center the two members 4 and 5 relative to each other.

However, the sloping contact faces 10 and 22 are positioned in such a way that this is only just possible (between 0.2 mm and 0.6 mm eccentricity or offset still will exist). Therefore, a prestressing of the sloping contact faces 10 and 22 towards each other is obtained. As a result of such prestressing the locking ring 23 will be pressed towards one side of the wall of the opening 18 in the lower member 5 of the coupling and friction forces directed against movement of the locking ring 23 arise. When this friction force is equal to the hydraulic force for driving annular piston 12, the penetration of the locking ring 23 into opening 18 will stop. The locking ring 23 will in this position, as shown in FIG. 1, physically prevent the contact faces 10 and 22 from being radially separated. The inclined contact faces 10 and 22 lock the two members of the flange to each other in such a way that they cannot be separated axially as long as the locking ring 23 remains in the position shown in FIG. 1.

When members 4, 5 are to be disconnected, the locking ring 23 is moved back to the upper member 4 by movement of piston 12, and the two members 4 and 5 then are free and can be separated. The use of hydraulic equipment to move the annular piston backwards and forwards makes remote control of the operation possible.

Figure 3:
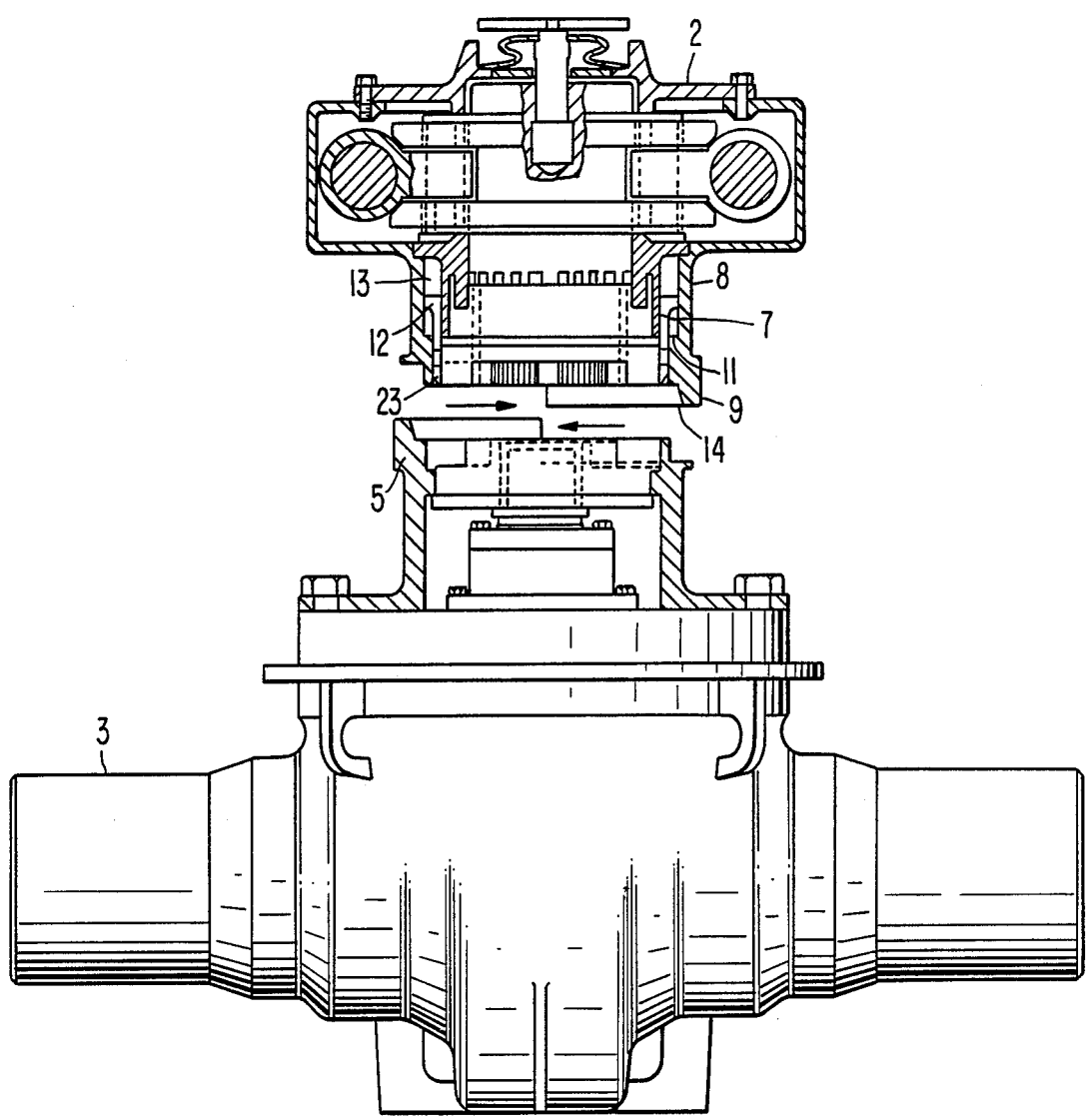
FIG. 3 is a view similar to FIG. 1, but showing an upper part of the coupling as a part of an actuator and the lower part fixed to a valve.

In FIG. 3 the upper member of the coupling is shown as a part of an actuator 2 and the lower member 5 is coupled to a valve 3. The arrows show the direction of coupling movement to overcome the necessary eccentricity to enable sloping faces to pass each other (8–12 mm).

I claim:

1. A coupling device for coupling and simultaneously locking two components both radially and axially, said device comprising:
    a first annular coupling member to be connected to or formed integrally with a first component, said first coupling member having therethrough an axial opening, said first coupling member having first and second circumferential portions having different axial lengths and joined by axially inclined first abutment surfaces;
    a second annular coupling member to be connected to a second component, said second coupling member having therethrough an axial opening, said second coupling member having third and fourth circumferential portions having different axial lengths and joined by axially inclined second abutment surfaces;
    said circumferential portions and said abutment surfaces of said first and second coupling members being complementary such that said first and second coupling members are relatively radially movable between a disconnected first position, whereat the axes of said openings are non-colinear and said first and second abutment surfaces are spaced by distances sufficient to allow relative axial movement between said first and second coupling members, and a connected second position, whereat said axes are moved toward colinear alignment and said first and second abutment surfaces are in contact and thereby prevent relative axial movement between said first and second coupling members; and
    locking means, mounted in one said coupling member and movable into said opening in the other said coupling member, for relatively radially moving said coupling members from said first position to said second position and for locking said coupling members in said second position and preventing relative movement therebetween both axially and radially.

2. A device as claimed in claim 1, wherein said first and second abutment surfaces are positioned such that said locking means causes said first and second abutment surfaces to be in tight stressing contact when said coupling members are locked in said second position.

3. A device as claimed in claim 1, wherein said first coupling member comprises an annular plate, an inner cylinder fixed to said plate and extending axially therefrom, a surrounding cylindrical part fixed to said plate and extending axially therefrom, said surrounding cylindrical part including an upper cylindrical portion surrounding said inner cylinder and a lower cylindrical portion having formed therein a semicylindrical recess defining said first abutment surfaces.

4. A device as claimed in claim 3, wherein said inner cylinder and said upper cylindrical portion define therebetween an annular chamber, and said locking means includes an annular piston mounted for axial movement in said annular chamber.

5. A device as claimed in claim 4, wherein said upper cylindrical portion has fluid flow passages leading to said annular chamber at opposite axial ends of said annular piston.

6. A device as claimed in claim 4, wherein said upper cylinder portion has a stop shoulder limiting axial movement to said annular piston.

7. A device as claimed in claim 4, wherein said second coupling member comprises a cylinder having formed therein a semicylindrical recess defining said second abutment surfaces and a semicircular disc, and a semicylindrical part extending axially from the inner periphery of said semicircular disc and having a radially extending end surface continuing around the inner periphery of said cylinder.

8. A device as claimed in claim 7, wherein said locking means further comprises an annularly continuous locking ring connected to said piston and movable thereby.

9. A device as claimed in claim 8, wherein said locking ring has an outer conical surface.

* * * * *